(12) United States Patent
Mao et al.

(10) Patent No.: US 7,357,743 B2
(45) Date of Patent: Apr. 15, 2008

(54) HUB MOTOR

(76) Inventors: Fengxiang Mao, Room 304, 822 Yi Shan Road, Xu Hui District, Shanghai (CN) 200233; Kee Ping Tho, 111 Hei Long Jiang Road, Kun Shan, Jiang Su (CN) 215300

( * ) Notice: Subject to any disclaimer, the term of this patent is extended or adjusted under 35 U.S.C. 154(b) by 216 days.

(21) Appl. No.: 11/155,051

(22) Filed: Jun. 17, 2005

(65) Prior Publication Data

US 2006/0287149 A1 Dec. 21, 2006

(51) Int. Cl.
*F16H 3/72* (2006.01)
*F16H 37/06* (2006.01)
*B60K 1/00* (2006.01)

(52) U.S. Cl. .......................... 475/5; 180/65.7
(58) Field of Classification Search ............... 475/1–5, 475/10; 180/65.5–65.7
See application file for complete search history.

(56) References Cited

U.S. PATENT DOCUMENTS 3,704,759 A * 12/1972 Vitkov et al. ............... 180/65.5
3,812,928 A * 5/1974 Rockwell et al. ........... 180/65.5
5,600,191 A * 2/1997 Yang ......................... 310/67 R
5,685,798 A * 11/1997 Lutz et al. .................. 475/331
6,328,123 B1 * 12/2001 Niemann et al. ........... 180/65.5
6,409,197 B1 * 6/2002 Endo et al. ................. 280/288.4
6,974,399 B2 * 12/2005 Lo ................................. 475/5
2006/0113859 A1 * 6/2006 Lu et al. ..................... 310/218
2006/0273686 A1 * 12/2006 Edelson et al. ............. 310/266

\* cited by examiner

*Primary Examiner*—Tisha Lewis
(74) *Attorney, Agent, or Firm*—Squire Sanders & Dempsey, LLP

(57) ABSTRACT

Provided herein is a hub motor, which includes: a motor shaft, which is non-rotational (e.g., fixed), a hub housing, which is connected to the motor shaft via bearings, a stator of the motor with winding, which is fixedly connected to the motor shaft, wherein, the hub motor further includes an outer rotor of the motor and a quasi-planet reduction gear drive mechanism, which includes a sun gear, a plurality of planet gears, a ring gear and a planet carrier, wherein the sun gear is fixedly connected to the outer rotor of motor, and the planet gears drive the hub housing to rotate. The hub motor of this invention adopts outer-rotor motor, in which the outer rotor rotates and is directly connected to the reducer mechanism.

8 Claims, 9 Drawing Sheets

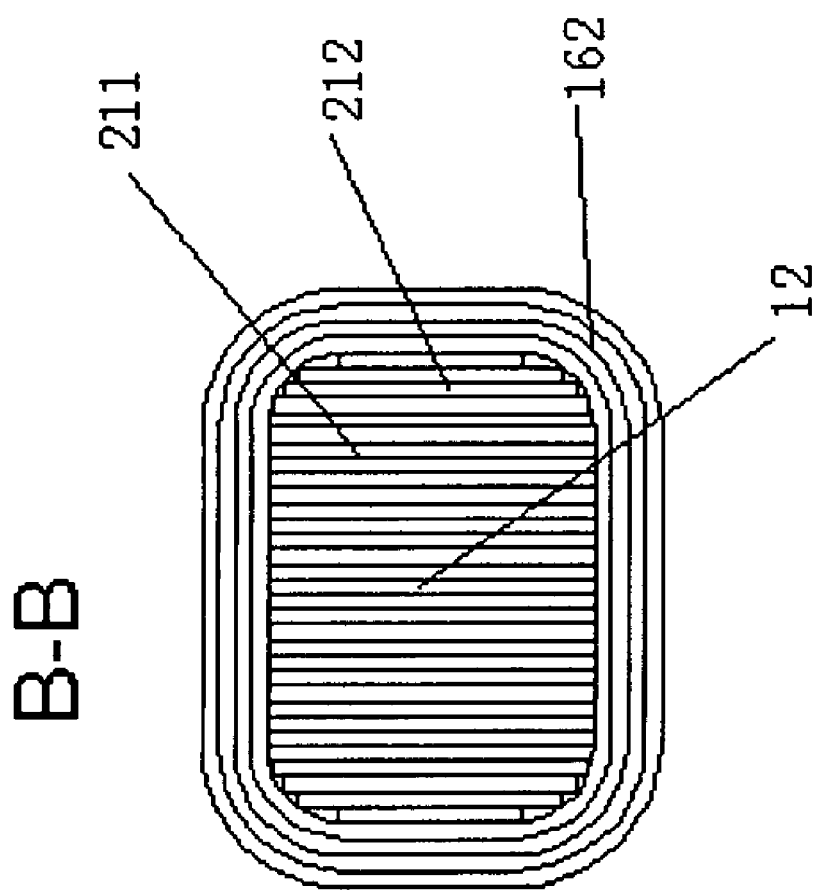

HUB MOTOR

TECHNICAL FIELD

The present invention relates to an electromotor, more specifically, to a hub motor in which a motor directly drives the hub to rotate.

BACKGROUND

Motors in which the motor directly drives the hub to rotate (hub motors) are extensively used for electric bicycles and other rotating mechanisms. The outer rotor of an existing hub motor directly drives the hub housing to rotate, but because a low rotational speed of the motor is required, the bulk of the motor is usually larger and the torque is smaller. In another hub motor, its rotational speed is relatively higher, and the rotation of its hub housing is driven by a reducer mechanism, e.g., a planetary reduction gear drive mechanism. However, due to usage of conventional inner-rotor motor, the motor shaft is connected directly with the reducer mechanism while the stator coil of the motor is wound on the outer rotor, the diameter of the inner rotor is smaller, and the output power per unit weight (volume) cannot be further increased. Alternatively, when a higher rotational speed is adopted to achieve this purpose, then technical difficulties and efficiency deterioration inevitablely occur.

SUMMARY

The technical problem to be settled by this invention is to provide a hub motor having higher output power, relatively lower rotational speed and high efficiency with the same bulk.

To achieve the above-mentioned object, the hub motor of this invention includes:
  a motor shaft, which is non-rotational (e.g., fixed);
  a hub housing, which is connected to the motor shaft via bearings;
  a stator of the motor with winding, which is fixedly connected to the motor shaft,
  wherein the hub motor further includes:
  an outer rotor of the motor; and
  a quasi-planet reduction gear drive mechanism, which includes a sun gear, a plurality of planet gears, a ring gear and a planet carrier, wherein the sun gear is fixedly connected to the outer rotor of motor, and the planet gears drive the hub housing to rotate.

Moreover, the rotating shaft of the planet gear can be fixed on the planet carrier, while the planet carrier can be fixedly connected to the motor shaft.

Yet moreover, the ring gear and the hub housing of the hub motor of this invention can be connected via a one-way clutch.

Furthermore, the slot hole of the stator core can adopt variable section too, further improving the specific power of motor; furthermore, a ring gear cover can be provided on the opening side of the ring gear, and fixed with the ring gear ensuring reliable lubrication for the mechanism.

The hub motor of this invention adopts outer-rotor motor, in which the outer rotor rotates and is directly connected to the reducer mechanism. Therefore, the output power per unit weight (volume) is greater, as compared with other electric hubs of the same power, the bulk of the hub motor of this invention is relatively smaller, thus it has very high use value. In addition, when used for electric bicycle, in case electric power is exhausted or man power is needed to drive for energy saving, the planetary reduction gear drive mechanism and the outer rotor of motor do not rotate accordingly. In this way, the power required for rotating the hub housing is reduced substantially, thus making it more convenient to use the electric bicycle equipped with the hub motor of the present invention.

In some embodiments, the hub motor described herein can be used to form a device. One example of such device is a bicycle. Another example of such device is a light vehicle. Examples of such light vehicle include golf carts, airport carts, motorcycles, and wheelchairs.

BRIEF DESCRIPTION OF DRAWINGS

FIG. 9 is a schematic diagram of the coil-wound silicon steel sheets of another embodiment of the invention.

DETAILED DESCRIPTION OF EMBODIMENTS

The following detailed description of the embodiments of the invention may be understood with reference to the accompanying drawings.

Figure 1:
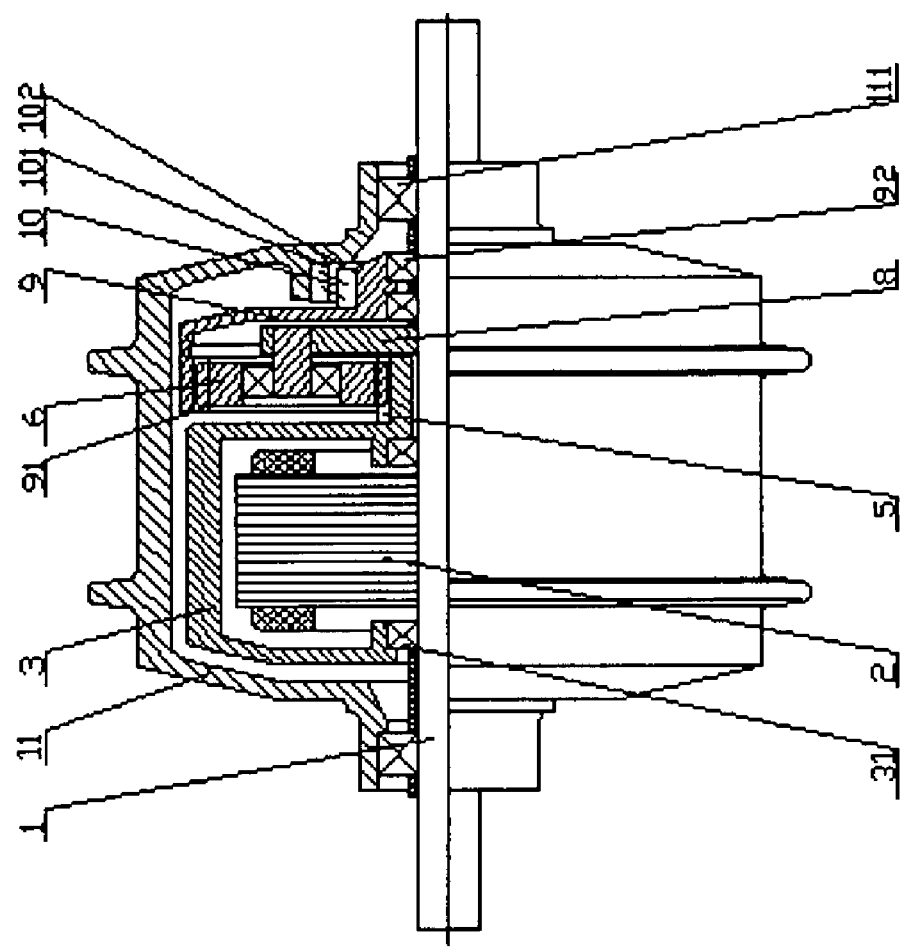
FIG. 1 is a schematic diagram of the hub motor provided by the invention.

Referring to FIG. 1, the hub motor provided by the invention includes a motor shaft 1, a stator (with wound coil) 2, an outer rotor 3, a sun gear 5, planet gears 6, a planet carrier 8, a ring gear 9, a one-way clutch 10, and a hub housing 11. The motor shaft 1 is non-rotational (e.g., fixed), and the stator 2 can be fixedly connected with the motor shaft 1. The outer rotor 3 can be connected to motor shaft 1 via bearing 31. When the motor is power-on, the outer rotor 3 rotates. The outer rotor 3 is connected to the sun gear 5, thus it drives the sun gear 5 to rotate. The sun gear 5, planet gear 6 and planet carrier 8 constitute a quasi-planet reduction gear drive mechanism. The rotational shaft 61 of the planet gear 6 is fixed on the planet carrier 8, while the planet carrier 8 is connected, e.g., fixedly connected, to the motor shaft. The ring gear 9 is disc-shaped and contains an inner gear 91, by which the ring gear engages with the planet gear 6, therefore the planet gear 6 can drive the ring gear 9 to rotate. The ring gear 9 is connected to the hub housing 11 via the one-way clutch 10. The hub housing 11 is connected to the motor shaft 1 via bearing 111.

The one-way clutch 10 can adopt a commonly used one-way clutch, with which the ring gear 9 can only drive the hub housing 11 to rotate in one direction. When the ring gear 9 rotates, it is connected to the hub housing 11, and the rotating ring gear 9 can drive the hub housing 11 to rotate; contrarily, when the hub housing 11 rotates, it is separated from the ring gear 9, and the hub housing 11 does not drive the ring gear 9 to rotate. In this embodiment, the one-way clutch 10 adopts a ratchet structure, which contains an outer gear 101 and n inner gear 102. There are two claws on the inner gear 102 (not shown). The outer gear 101 is a ratchet containing inner tooth. The claws can engage with the inner tooth, ensuring one-way rotation. The inner gear 102 is fixed with the ring gear 9, while the outer gear 101 is connected (e.g., fixedly connected) to the hub housing 11.

Figure 2:
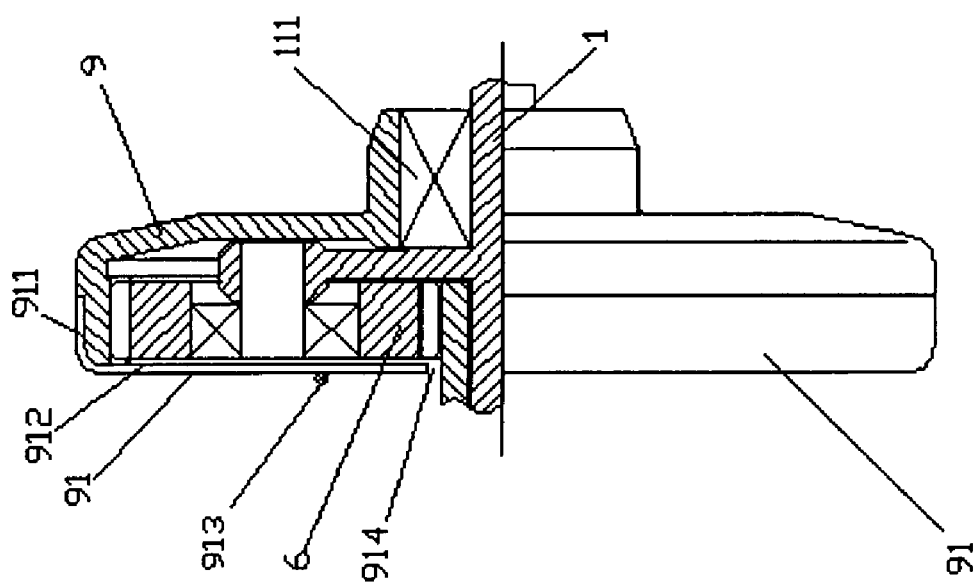
FIG. 2 is a schematic diagram of the planetary reduction gear drive mechanism of the hub motor provided by the invention.

Referring to FIG. 2, a ring gear cover 91 is provided on the left side (opening side) of the ring gear 9, and the ring gear cover 91 is bowl shaped, it has a side 911 and a bottom 912, and a middle hole 913 in its center. The side 911 is fixed with the outer periphery of the ring gear 9, the bottom 912 runs parallel with and is close to the left side of the ring gear 9, e.g., the distance between them is 1-2 mm.

Besides, in order to further improve sealing performance, a sealing ring 914 is provided between the outer surface of the ring gear cover and the neighboring part (e.g., the motor housing), for further preventing the lubricating grease from leaking.

Figure 3:
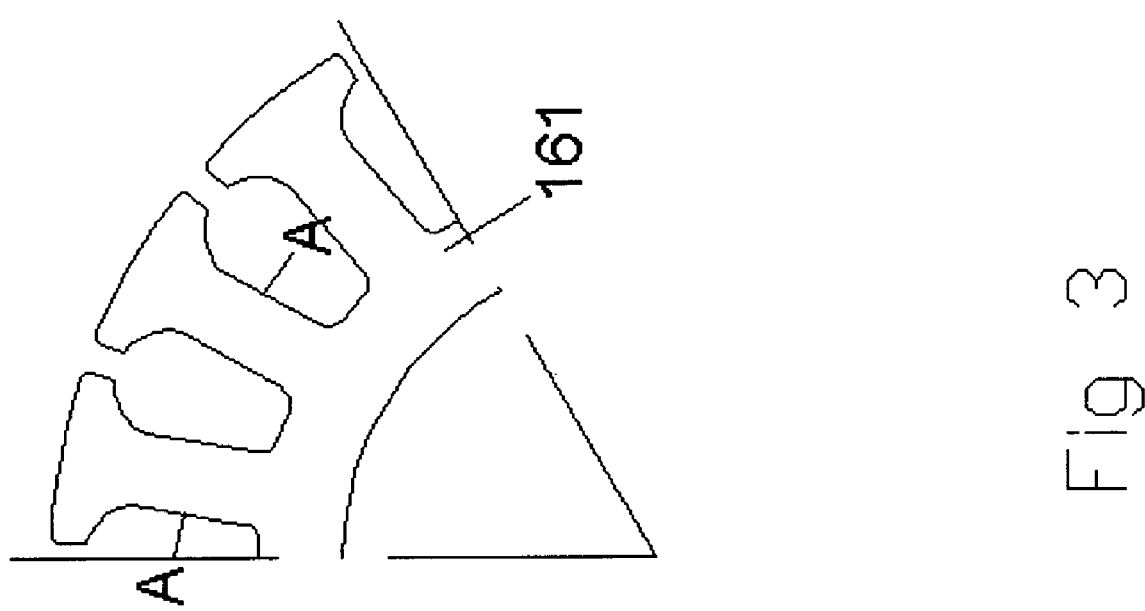
FIG. 3 is a schematic diagram of the main body of the steel sheet of an existing electromotor.
Figure 4:
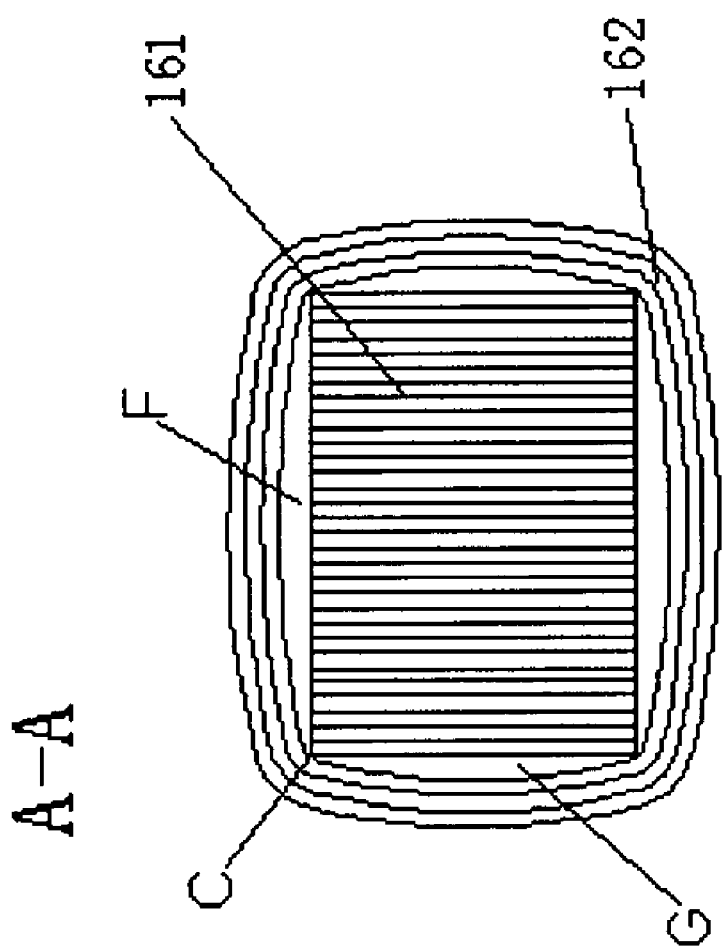
FIG. 4 is the A-A cross-sectional profile of FIG. 3.
Figure 5:
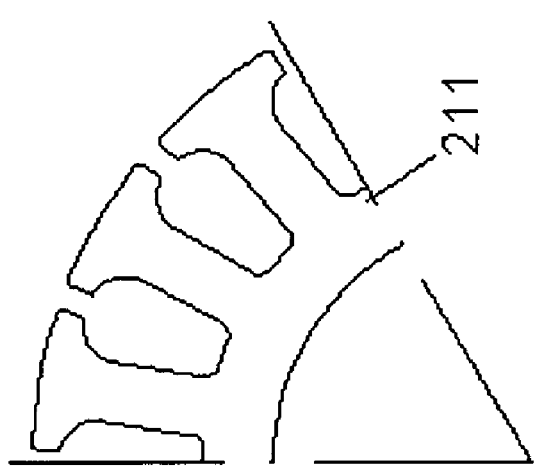
FIG. 5 is a schematic diagram of the basic type silicon steel sheet of the stator of the hub motor of the invention.

Moreover, the stator of an existing electromotor has an iron core made of multi-piece silicon steel sheet wound with coils. Referring to FIG. 3 and FIG. 4, slot holes with gaps are formed by punching in the periphery of the existing silicon steel sheet 161, the slot holes are used for receiving the wound coil 162. Because the above-mentioned holes in all silicon steel sheets 161 are the same, the cross section of the wound coil 162 is a rectangle, in this way, there are four right angles C. Because the wire of the coil always has a certain hardness, in this way, while winding, it will form certain spaces F, G on both sides of the above-mentioned rectangle. Because of the above-mentioned space, the magnetic force induction produced by the rotor or stator of the motor is reduced, and certainly the efficiency of the motor is lowered.

Figure 6:
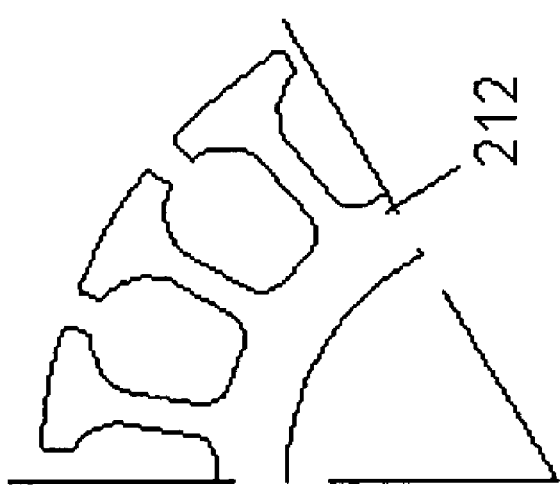
FIG. 6 is the schematic diagram of the variable type silicon steel sheet of the stator of the hub motor of the invention.
Figure 7:
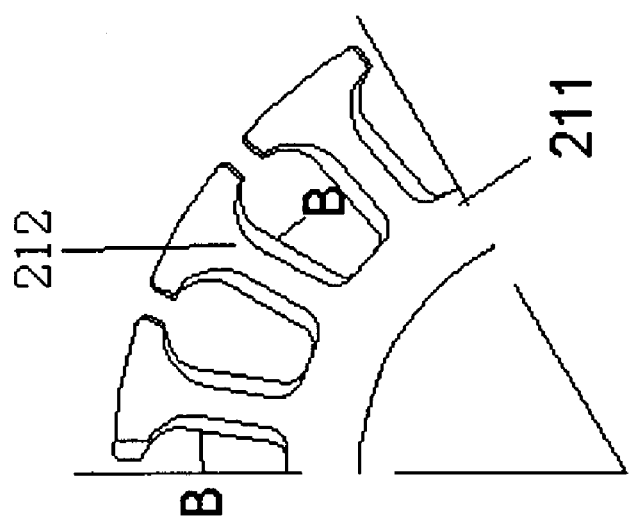
FIG. 7 is an end view of the main body of the silicon steel sheets of the stator of the hub motor of the invention.
Figure 8:
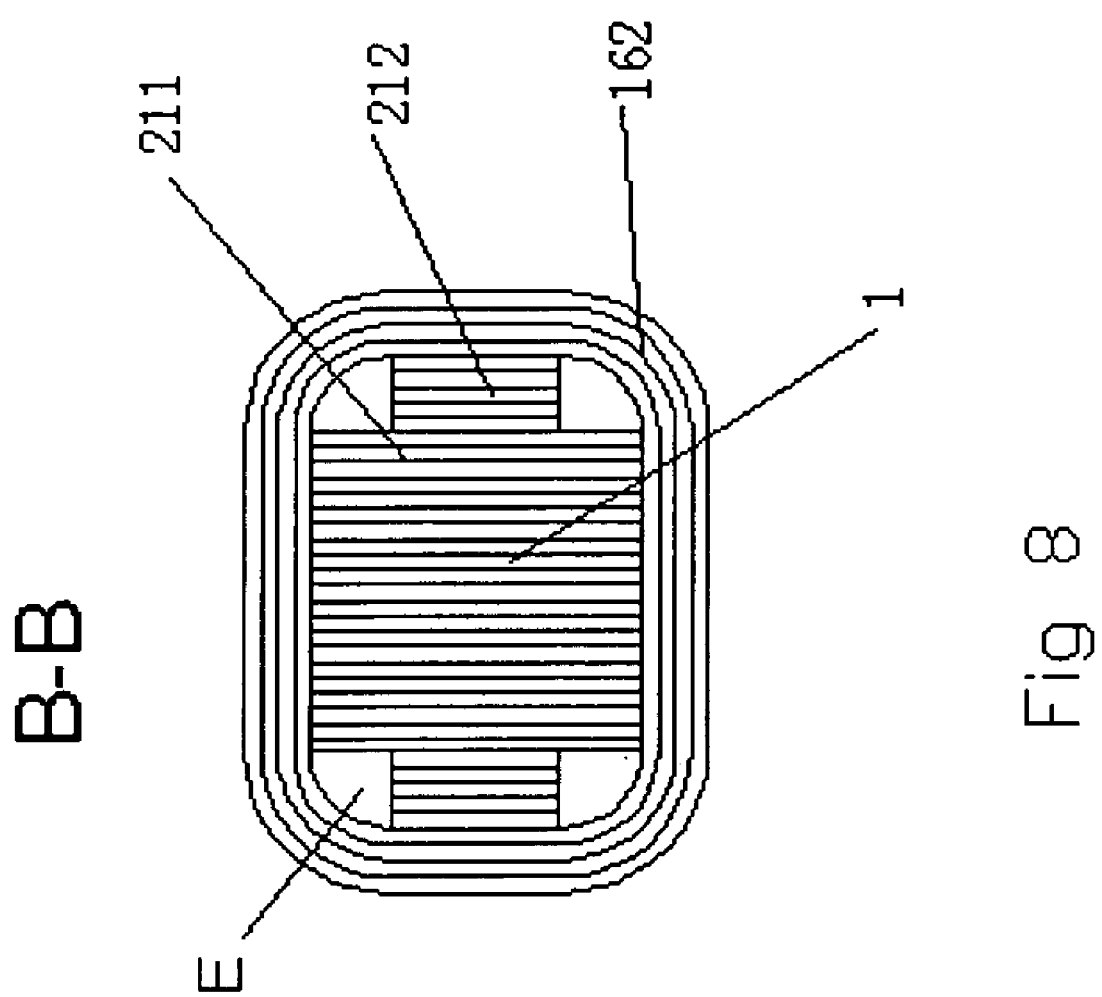
FIG. 8 is a schematic diagram of the coil-wound silicon steel sheets of an embodiment of the invention.

To improve the efficiency of the motor, the invention divides the silicon steel sheets into basic type silicon steel sheets and variable type silicon steel sheets (FIGS. 5-8). The hub motor of the invention includes a housing, a rotor and a stator. The stator 2 is formed by stacking the basic type silicon steel sheets 211 (FIG. 5) and variable type silicon steel sheets 212 (FIG. 6). Among them, there are more basic silicon steel sheets 211, which jointly make up of the main part of the magnetic induction of the electromotor, and in the periphery of the basic type silicon steel sheets 211 and the variable type silicon steel sheets 212 a plurality of slot holes with gaps are punched. The slot holes with gaps can be hold in various shapes, usually they like the one illustrated in FIG. 3. The slot hole with gap in the periphery of the variable type silicon steel sheet 212 is bigger than that of the basic type silicon steel sheet 211. The coil 162 is wound between the two adjacent slot holes with gaps of the above-mentioned silicon steel sheets. Among them, the basic type silicon steel sheets 211 are arranged in the center of the main body 221, and at both ends the variable type silicon steel sheets are stacked. In this way, the end view of the main body 221 is shown in FIG. 7. When the coil is wound, referring to FIG. 8, a transition section E can be formed at each of the four angles of the main body 221, enabling the coil to be well wound on and clung closely to the silicon steel sheets, the practice decreases the bulk of the coil and increases the magnetic force produced by the motor rotor or stator, and the efficiency of the motor is improved too.

Referring to FIG. 9, the difference between another embodiment for the motor stator 2 of the invention and the first embodiment is that the variable type silicon steel sheets 212 can be divided into a plurality of sets according to the size of the gap. From both ends of the main body, the size of the slot hole with gap in these sets varies constantly from big to small. In this way, a better transition section can be formed at the four angles of the main body 221, enabling the coil to be well wound on and clung closely to the silicon steel sheets, thus further improving the efficiency of the motor.

In some embodiments, the hub motor described herein can be used to form a device. One example of such device is a bicycle. Another example of such device is a light vehicle. Examples of such light vehicle include golf carts, airport carts, motorcycles, and wheelchairs.

The scope of protection of the present invention is not intended to be limited to the above described preferred embodiments, and those skilled in the art are capable of making many changes and modifications on the basis of the above-mentioned embodiments. The present invention is intended to be limited only as set forth in the accompanying claims.

The invention claimed is:

1. A hub motor comprising:
   a motor shaft, which is fixed and non-rotational;
   a hub housing connected to the motor shaft via bearings;
   a stator of the motor with windings, which are fixedly connected to the motor shaft,
   wherein the hub motor further comprises:
   an outer rotor of the motor; and
   a quasi-planet reduction gear drive mechanism, which includes a sun gear, a plurality of planet gears, a ring gear and a planet carrier, wherein the sun gear is fixedly connected to the outer rotor of the motor and the planet gear drives the hub housing to rotate, and
   wherein on the opening side of the bowl-shaped ring gear, a ring gear cover is also provided, the ring gear cover being fixed with the bowl-shaped ring gear in the periphery and maintaining a gap with the planet gear.

2. The hub motor as set forth in claim 1, wherein a sealing ring is provided between the outer surface of the ring gear cover and the neighboring part of the motor rotor.

3. A hub motor comprising:
   a motor shaft, which is fixed and non-rotational;
   a hub housing connected to the motor shaft via bearings;
   a stator of the motor with windings, which are fixedly connected to the motor shaft,
   wherein the hub motor further comprises:
   an outer rotor of the motor; and
   a quasi-planet reduction gear drive mechanism, which includes a sun gear, a plurality of planet gears, a ring gear and a planet carrier, wherein the sun gear is fixedly connected to the outer rotor of the motor and the planet gear drives the hub housing to rotate,
   wherein the stator core of the motor is formed of a material comprising silicon steel sheets,
   wherein the periphery of the silicon steel sheet includes a plurality of slot holes with gaps, and coils between the neighboring slot holes, and
   wherein the silicon steel sheets include basic silicon steel sheets and variable silicon steel sheets, the basic steel sheets making up the main body of the stator, both ends of the main body including a plurality of variable silicon steel sheets, and the size of the slot hole with gap in the periphery of the variable silicon steel sheet being bigger than size of the slot hole with gap in the periphery of the basic steel silicon steel sheet, forming a ladder slot hole with variable cross section.

4. The hub motor as set forth in claim 3, wherein the variable silicon steel sheets are divided into a plurality of sets, and from both ends to the center of the main body, the size of the slot hole with gap varies continuingly from big to small, so that slot holes with gaps having gradually variable cross sections are formed.

5. A bicycle comprising a hub motor, the hub motor comprising:
 a motor shaft, which is fixed and non-rotational;
 a hub housing connected to the motor shaft via bearings;
 a stator of the motor with windings, which are fixedly connected to the motor shaft,
 wherein the hub motor further comprises:
 an outer rotor of the motor; and
 a quasi-planet reduction gear drive mechanism, which includes a sun gear, a plurality of planet gears, a ring gear and a planet carrier, wherein the sun gear is fixedly connected to the outer rotor of the motor and the planet gear drives the hub housing to rotate, and
wherein on the opening side of the bowl-shaped ring gear, a ring gear cover is also provided, the ring gear cover being fixed with the bowl-shaped ring gear in the periphery and maintaining a gap with the planet gear.

6. The bicycle of claim 5, wherein a sealing ring is provided between the outer surface of the ring gear cover and the neighboring part of the motor rotor.

7. A bicycle comprising a hub motor, the hub motor comprising:
 a motor shaft, which is fixed and non-rotational;
 a hub housing connected to the motor shaft via bearings;
 a stator of the motor with windings, which are fixedly connected to the motor shaft,
 wherein the hub motor further comprises:
 an outer rotor of the motor; and
 a quasi-planet reduction gear drive mechanism, which includes a sun gear, a plurality of planet gears, a ring gear and a planet carrier, wherein the sun gear is fixedly connected to the outer rotor of the motor and the planet gear drives the hub housing to rotate,
 wherein the stator core of the motor is formed of a material comprising silicon steel sheets,
 wherein the periphery of the silicon steel sheet includes a plurality of slot holes with gaps, and coils between the neighboring slot holes, and
wherein the silicon steel sheets include basic silicon steel sheets and variable silicon steel sheets, the basic steel sheets making up the main body of the stator, both ends of the main body including a plurality of variable silicon steel sheets, and the size of the slot hole with gap in the periphery of the variable silicon steel sheet being bigger than size of the slot hole with gap in the periphery of the basic steel silicon steel sheet, forming a ladder slot hole with variable cross section.

8. The bicycle comprising the hub motor of claim 7, wherein the variable silicon steel sheets are divided into a plurality of sets, and from both ends to the center of the main body, the size of the slot hole with gap varies continuingly from big to small, so that slot holes with gaps having gradually variable cross sections are formed.

* * * * *